(12) United States Patent
Sampson et al.

(10) Patent No.: US 8,112,501 B2
(45) Date of Patent: *Feb. 7, 2012

(54) CENTRALIZED REGISTRATION FOR DISTRIBUTED SOCIAL CONTENT SERVICES

(75) Inventors: Todd Sampson, Orlando, FL (US); John Sampson, Orlando, FL (US); Steve Ho, Apopka, FL (US); Eric Marcoullier, San Francisco, CA (US); Neil Scott Rafer, San Francisco, CA (US)

(73) Assignee: YAHOO! Inc., Sunnyvale, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/694,741

(22) Filed: Mar. 30, 2007

(65) Prior Publication Data

US 2008/0244413 A1 Oct. 2, 2008

(51) Int. Cl.
*G06F 15/16* (2006.01)
*G06Q 99/00* (2006.01)

(52) U.S. Cl. .............. 709/219; 709/204; 707/999.1; 705/319

(58) Field of Classification Search .................. None
See application file for complete search history.

(56) References Cited

U.S. PATENT DOCUMENTS

| | | | |
|---|---|---|---|
| 7,730,216 B1* | 6/2010 | Issa et al. | 709/250 |
| 7,853,881 B1* | 12/2010 | Assal et al. | 715/734 |
| 2004/0034573 A1 | 2/2004 | Cohen | |
| 2005/0216300 A1* | 9/2005 | Appelman et al. | 705/1 |
| 2006/0256109 A1* | 11/2006 | Acker et al. | 345/419 |
| 2007/0030824 A1* | 2/2007 | Ribaudo et al. | 370/328 |
| 2007/0106627 A1 | 5/2007 | Srivastava et al. | |
| 2008/0046327 A1 | 2/2008 | Schnietz | |
| 2008/0052203 A1* | 2/2008 | Beyer et al. | 705/28 |
| 2008/0077595 A1 | 3/2008 | Leebow | |
| 2008/0080392 A1* | 4/2008 | Walsh et al. | 370/254 |
| 2008/0172496 A1* | 7/2008 | Middleton et al. | 709/246 |

OTHER PUBLICATIONS

Gravatar—Globally Recognized Avatars, http://site.gravatar.com, 1 page (accessed Mar. 14, 2007).
Gravatar Blog, http://blog.gravatar.com, 6 pages (accessed Mar. 14, 2007).
My gravatars, http://blog.gravatar.com/assets/2007/2/1/gravatar_screenshot_emails.png, 1 page (accessed Mar. 14, 2007).
Official Communication for U.S. Appl. No. 11/756,523 mailed Feb. 23, 2010.
Official Communication for U.S. Appl. No. 11/756,523 mailed Jul. 23, 2010.

(Continued)

*Primary Examiner* — Wen-Tai Lin
(74) *Attorney, Agent, or Firm* — Frommer Lawrence & Haug LLP; Jamie L. Wiegand

(57) ABSTRACT

A system and method are directed towards enabling centralized registration for managing a selective display of visitor information to distributed social networking websites. A visitor may enter selective personal information, and determine what information is made available on a social networking webpage. The visitor may then return to the social networking website to view selective visitor information, such as within a reader roll. A visitor to a social networking website may select to not have their information displayed at selective a social networking website, while still being displayed at another social networking website. In one embodiment, selecting to not display their information may be performed by 'mousing' over their information and selecting a display option. Social networking websites may look to a centralized registration system to determine whether to display the visitor information, while still being able to obtain information about the visitor, and/or provide benefits to the visitor.

19 Claims, 6 Drawing Sheets

OTHER PUBLICATIONS

Official Communication for U.S. Appl. No. 11/756,523 mailed Sep. 29, 2010.

Official Communication for U.S. Appl. No. 11/756,523 mailed Jun. 6, 2011.

* cited by examiner

CENTRALIZED REGISTRATION FOR DISTRIBUTED SOCIAL CONTENT SERVICES

TECHNICAL FIELD

The present invention relates generally to social networking and, more particularly, but not exclusively to enabling centralized registration for, and managing of distributed social content services, in which one example includes a selective display of reader rolls of visitors to social networking websites.

BACKGROUND

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and the world.

The development of such online social networks touch countless aspects of our everyday lives, providing instant access to people of similar mindsets, and enabling us to form partnerships with more people in more ways than ever before. For example, an increasing number of people are creating and/or visiting network blogs (or web logs). Briefly, a blog is a social networking website where a user may provide commentaries, news, graphics, videos, or the like, in a journal style. Such entries may be on virtually any subject, including food, politics, movies, movie stars, videos, music, gambling, shopping, politics, or even personal online diaries.

With bloggers (blog authors) talking amongst each other on their blog sites, many may wonder who is actually reading or even have read the blogs. Typically, while a reader might see on the blog, or other network site, a counter of visits, unless the visitor registers with the blog, or network site, others may not know much more about who is visiting a site. Moreover, such displays typically display who is currently visiting a blog.

However, visitors typically have to register at each network site that they visit, for unique information about the visitor to be captured. Unfortunately, visitors to various network sites may elect not to register for each site that they visit for a variety of reasons. For example, they may select not to register to network sites that they may only infrequently visit. Moreover, a visitor may fail to register at the network site or to complete registration that they may start at a network site, due to what is often termed registration fatigue. Such registration fatigue may arise because the registration process is too complex, tedious, or demanding for the visitor. As more network sites are visited by a visitor that may seek visitor registration, the more likely the incidence of fatigue. However, not only does such registration fatigue affect the accuracy of a network site's visitor statistics, popularity index, or the like, but, such registration fatigue may result in missed opportunities offered by some of the network sites to the visitor. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
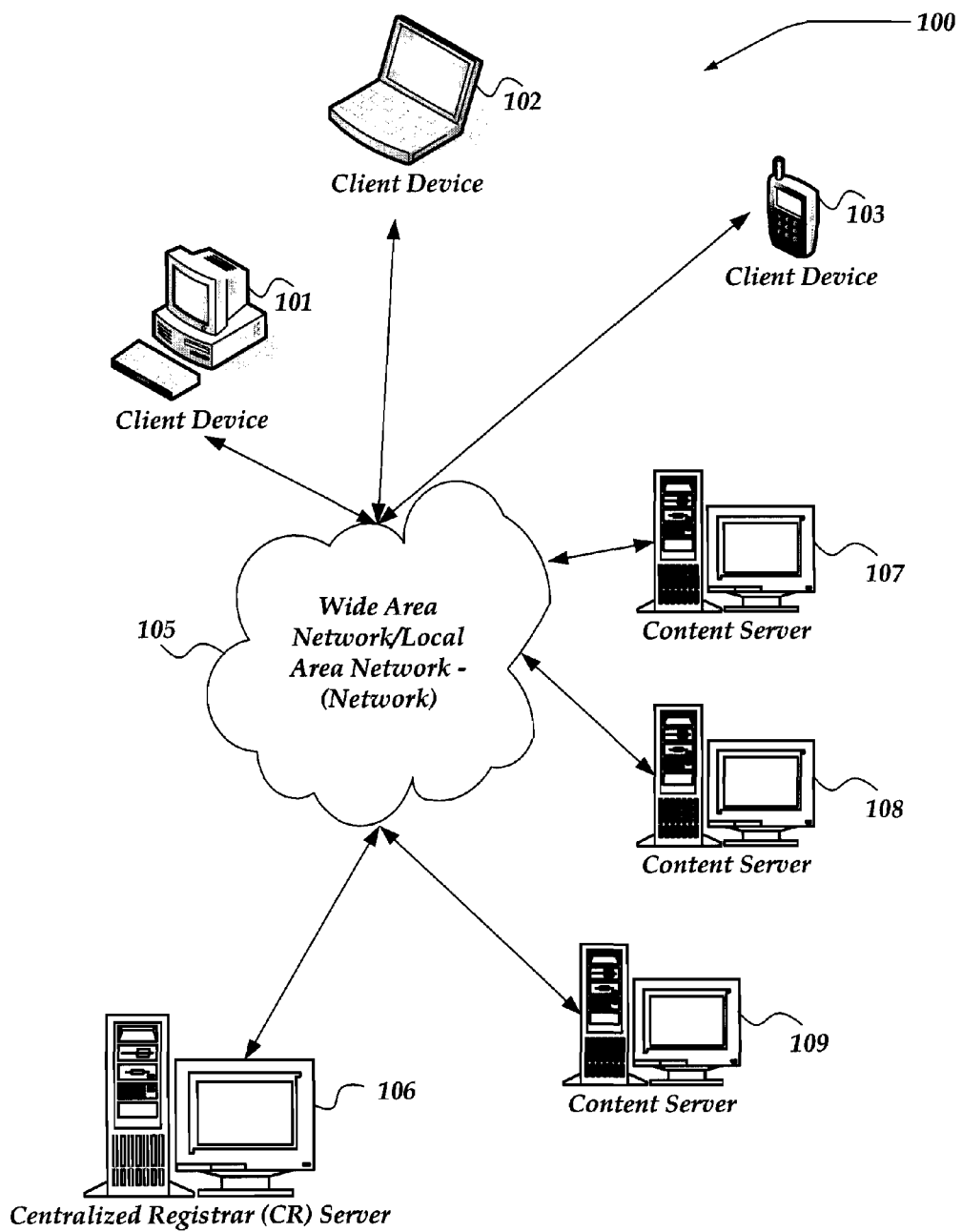
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

The term "distributed networking sites," refers a plurality of networking sites, or similar networking sites, that are configured and arranged to receive visitor information distributed from a centralized data source. In a typical example, a plurality of websites may register to receive such visitor information. At least one of the plurality of networking sites is managed distinct from another one of the plurality.

The following briefly describes the invention in order to provide a basic understanding of some aspects of the invention. This brief description is not intended as an extensive overview. It is not intended to identify key or critical elements, or to delineate or otherwise narrow the scope of the invention. Its purpose is merely to present some concepts in a simplified form as a prelude to the more detailed description that is presented later.

Briefly stated the present invention is directed towards enabling centralized registration for, and managing of various distributed social content services. An example of use of such centralized registration includes a selective display of reader rolls of visitors to social networking websites. A centralized registration system for distributed social content services may be accessed through, for example, a social networking website, such as a blog, or the like. A visitor may enter through the centralized registration system selective personal information, including profile information such as a photograph, name, alias, address or the like; contact information, including, for example, email address, phone numbers, IM addresses, mailing address, or the like; information about social networking communities the visitor participates in; or the like. In one embodiment, the visitor may select what information is made available for display in a reader roll. The reader roll may then be employed to provide selective information about recent visitors to the social networking website. Unlike traditional lists of visitors to a website, the present invention may selectively display recent visitor information for visitors that might not currently be accessing the social networking website. In another embodiment, at least one displayed visitor is currently accessing the social networking website. A visitor to a social networking website may select to not have their information displayed at a social networking website, while still being displayed at another social networking website. In one embodiment, selecting whether to display their information at one social networking site or not to display their information at another social networking site may be performed during registration, or at any later time. In one embodiment, selecting to not display their information may be performed by 'mousing' over their information within a displayed reader roll and selecting a display option. Social networking websites may then look to the centralized registration system to determine whether to display the visitor information, while still being able to obtain information about the visitor, and/or provide benefits to the visitor.

It should be noted however, that the invention is not constrained to merely displaying selective information for a visitor within a reader roll. For example, at least some of the centrally registered information may also be displayed within a ratings form, an array of avatars of visitors, or the like. Moreover, it should be clear that virtually any visitor information provided within the central registration system may be used by one or more distributed social content source.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, Centralized Registrar (CR) server 106, client devices 101-103, and content servers 107-109.

Generally, client devices 101-103 may include virtually any computing device capable of connecting to another computing device to send and receive information, including web requests for information from a server, providing content, or the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any network device. Similarly, client devices 101-103 may be any device that is capable of connecting using a wired or wireless communication medium such as a PDA, POCKET PC, wearable computer, and any other device that is equipped to communicate over a wired and/or wireless communication medium.

Client devices 101-103 may include a client application that may be configured to provide information that identifies itself, including a type, capability, name, and the like. Client devices 101-103 may identify themselves through any of a variety of mechanisms, including a phone number, Mobile Identification Number (MIN), an electronic serial number (ESN), or a network address, such as an Internet Protocol (IP) address, or other network address identifier. In one embodiment, client devices 101-103 may be configured to provide such network address identifier in a message, or the like, sent over network 105 to another computing device. In one embodiment, at least some information about the client device may also be provided to another computing device, through a network cookie.

Client devices 101-103 may further include a client application that is configured to manage various actions. For example, client devices 101-103 may include a web browser application that is configured to enable an end-user to interact with other devices and/or applications over network 105. For example, client devices 101-103 may enable use of the web browser to access content, web pages, or the like, from another computing device, such as content servers 107-109, or the like. In one embodiment, client devices 101-103 may receive a network cookie from and/or provide the network cookie to content servers 106-109, and/or CR server 106.

In addition, client devices 101-103 may employ a variety of other client applications to communicate with other devices over network 105, including, but not limited to Voice Over Internet Protocol (VOIP), Instant Messaging (IM), Short Message Service (SMS), Multimedia Message Service (MMS), email, or the like. Thus, client devices 101-103 may employ a variety of mechanisms to establish network sessions with another computing device.

Network 105 is configured to couple one computing device with another computing device to enable them to communication information. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of a network device configured to operate as a distributed content server is described in more detail below in conjunction with FIG. 3. Briefly, however, content servers 107-109, may be configured to operate as website servers. However, content servers 107-109 are not limited to web servers, and may also operate a messaging server, a File Transfer Protocol (FTP) server, a database server, content server, and the like. Additionally, each of content servers 107-109 may be configured to perform a different operation. Thus, for example, content server 107 may be configured as a blog website, while content server 108 may be configured as music or video download server. Moreover, while content servers 107-109 may operate as other than a website, they may still be enabled to receive an HTTP communication. In one embodiment, content servers 107-109 may each operate a blog site, or other social networking website. In any event, content servers 107-109 collectively represent one embodiment of a distributed content source, in that content, such as social networking content, may be distributed across a plurality of different servers.

In one embodiment, content servers 107-109 may be configured to provide visitor information using, for example, a reader roll. However, content servers 107-109 may also obtain and display visitor information using any of a variety of other formats, structures, or the like. In any event, in one embodiment, the reader roll may be arranged to selectively display information about recent visitors to the content server. The reader roll may display information about a visitor that is not currently accessing the content server, in one embodiment. However, the reader roll may also display information about a current visitor to the content server. The reader roll may be configured to display virtually any number of recent visitors. However, in one embodiment, a visitor may select to not have their information displayed in a reader roll, or other mechanism, for one content server, while having their information displayed in a reader roll, or another mechanism, for another content server. One embodiment of an example reader roll is described in more detail below in conjunction with FIG. 6.

In one embodiment, content servers 107-109 may be configured to display a screen, menu, link, or the like, to enable a visitor to centrally register. In one embodiment, when a visitor selects to centrally register, content servers 107-109 might redirect the visitor to CR server 106. Once centrally registered, each content server that subscribes to CR server 106's services may access and selectively display visitor information. One embodiment of a process for selectively displaying visitor information within a reader roll is described in more detail below in conjunction with FIG. 5. However, the invention is not constrained to displaying visitor information within a reader roll. For example, in one embodiment, commentaries may be selectively displayed, avatars, photographs, favorite links, or the like, may also be selectively displayed using any of a variety of formats, structures, or the like, including but not limited to lists, tables, frames, or the like.

Devices that may operate as content servers 107-109 include personal computers desktop computers, multiprocessor systems, microprocessor-based or programmable consumer electronics, network PCs, servers, and the like.

One embodiment of CR server 106 is described in more detail below in conjunction with FIG. 2. Briefly, however, CR server 106 may include any computing device capable of connecting to network 105 to enable a visitor to a social network website, or virtually any other website, to centrally register for display and/or use of their information at the website. In one embodiment, the website may hosted by content servers 107-109. In one embodiment, the website may employ the visitor information to provide a benefit to the visitor, including, for example, a discount, access to selected additional information, coupons, videos, or the like. In one embodiment, the content servers 107-109 may further employ the visitor information to track the visitor's access of information, and to display whether the visitor is a recent visitor (reader) of the website, or even another website.

CR server 106 may enable registration by a visitor, and manage a centralized data store for use by content servers 107-109, or other distributed social content sources. In one embodiment, CR server 106 may provide a menu interface, a forms interface, window, or the like, to enable a visitor to enter personal information, including, but not limited to profile information such as a photograph, name, alias, address or the like; contact information, including, for example, email address, phone numbers, IM addresses, mailing address, or the like; information about social networking communities the visitor participates in; or the like. The invention is not limited to this information, and other information may also be provided, without departing from the scope of the invention. For example, in one embodiment, the visitor may select which social network sites, or the like, the visitor does/does not want their information to be displayed within a reader roll. In one embodiment, a registered visitor may receive a unique identifier that is useable at content servers 107-109. In one embodiment, the unique identifier may be provided within a cookie. However, the unique identifier may also be provided using any of a variety of other mechanisms. In one embodiment, the unique identifier may be created based on a timestamp, or the like. In one embodiment, the unique identifier may be encrypted.

When a registered visitor visits one of content servers 107-109, the visitor may provide the unique identifier to the visited content server. The visited content server may then provide the unique identifier to CR server 106. CR server 106 may perform a search using the unique identifier. If a match is found, CR server 106 may provide information about the visitor to the visited content server, where the visited content server may selectively display at least some of the information about the visitor, and/or employ the information for any of variety of other usages. One embodiment of a process useable for central registration is described in more detail below in conjunction with FIG. 4.

Devices that may operate as CR server 106 include personal computers desktop computers, multiprocessor systems, microprocessor-based or programmable consumer electronics, network PCs, servers, and the like.

Although FIG. 1 illustrates CR server 106 as a single computing device, the invention is not so limited. For example, one or more functions of CR server 106 may be distributed across one or more distinct computing devices.

Illustrative Centralized Registrar Environment

Figure 2:
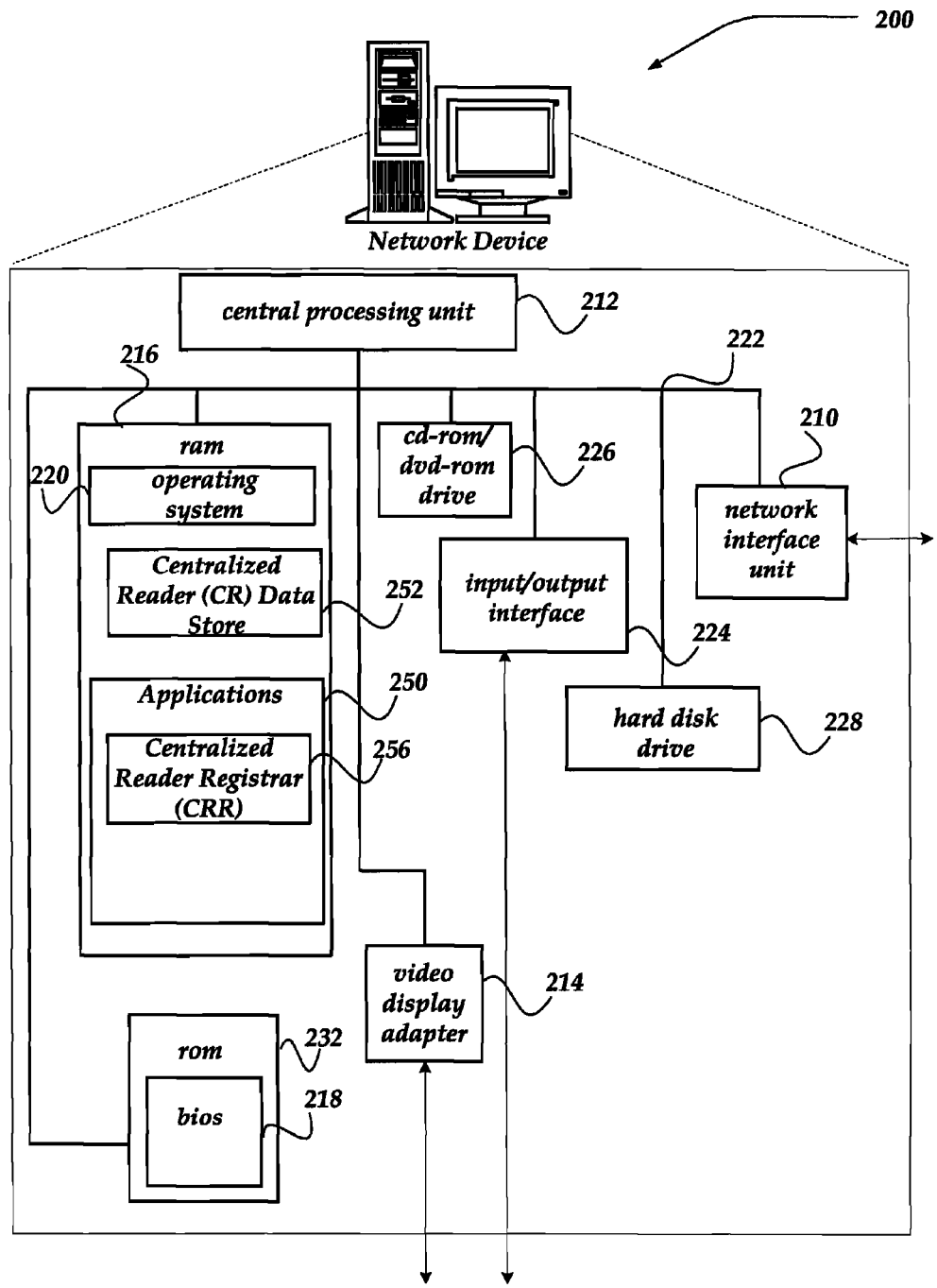
FIG. 2 shows one embodiment of a network device useable for centralized reader roll registration.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, CR server 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management, web servers, and so forth. Mass memory also includes centralized reader (CR) data store 252. Applications 250 also include Centralized Reader Registrar (CRR) 256.

CR data store 252 is configured and arranged to receive and manage centralized reader registrations for use by any of a variety of distributed content servers, or the like, that request access to registered visitor information. CR data store 252 may include any of a variety of information related with the registered, including, but not limited to an alias, a name, a birth date, a gender, an address, an avatar, or other photograph, an email address, a phone number, various other account addresses including but not limited to IM, ICQ accounts, or the like. CR data store 252 may also include information about user names associated with the visitor for various social networking communities, or the like. CR data store 252 may further include information about visitor preferences, including which social networking sites the visitor has selected not to have their information displayed, or the like. CR data store 252 may be implemented as a data base, a folder, a script, a program, or the like. Moreover, CR data store 252 may also be configured and arranged to reside within hard disk drive 228, cd-rom/dvd-rom drive 226, a removable storage device, or any of a variety of other storage mediums.

CRR 256 is configured and arranged to manage centralized registrations for visitors to various content servers, such as content servers 107-109 of FIG. 1. CRR 256 may receive a request for registration from a visitor of a content server. In one embodiment, the content server may redirect the visitor to CRR 256 to perform centralized registration. CRR 256 may provide a user interface that may include forms, menus, selectable icons, links, or the like, configured to receive visitor registration information. In one embodiment, the visitor may provide photographs, links, or the like, as part of the registration process. In one embodiment, the visitor need not provide a complete set of registration information, and a minimum set of information might be provided. Moreover, the visitor may also modify information provided during an initial centralized registration, or even at a subsequent time. The visitor may also—un-register from the centralized registration system of CRR 256.

When a visitor has initially registered, CRR 256 may provide the visitor with a unique identifier, useable for enabling selective display of at least some of the visitor's information. In one embodiment, the unique identifier is a sequence of digits that may include, at least in part, a timestamp. However, the unique identifier is not constrained to including timestamps, and virtually any other data may be employed to generate the unique identifier, including but not limited to at least some of the information provided by the visitor during registration, or a combination of such information. In one embodiment, the unique identifier is encrypted. In one embodiment, the unique identifier may be provided to the visitor in a network cookie. However, the invention is not so limited, and the unique identifier may be provided using any of a variety of other mechanisms.

CRR 256 may be further configured to receive the unique identifier from a content server. CRR 256 may perform a search with CR data store 252 for a match on the unique identifier. If a match is found, CRR 256 may then provide the content server with the registered visitor information. In one embodiment, CRR 256 may also provide an indicator identifying whether the visitor has requested that their information not be displayed by the requesting content server. CRR 256 may, in one embodiment, employ a process such as described below in conjunction with FIG. 4 to perform at least some of its actions.

Illustrative Content Server Environment

Figure 3:
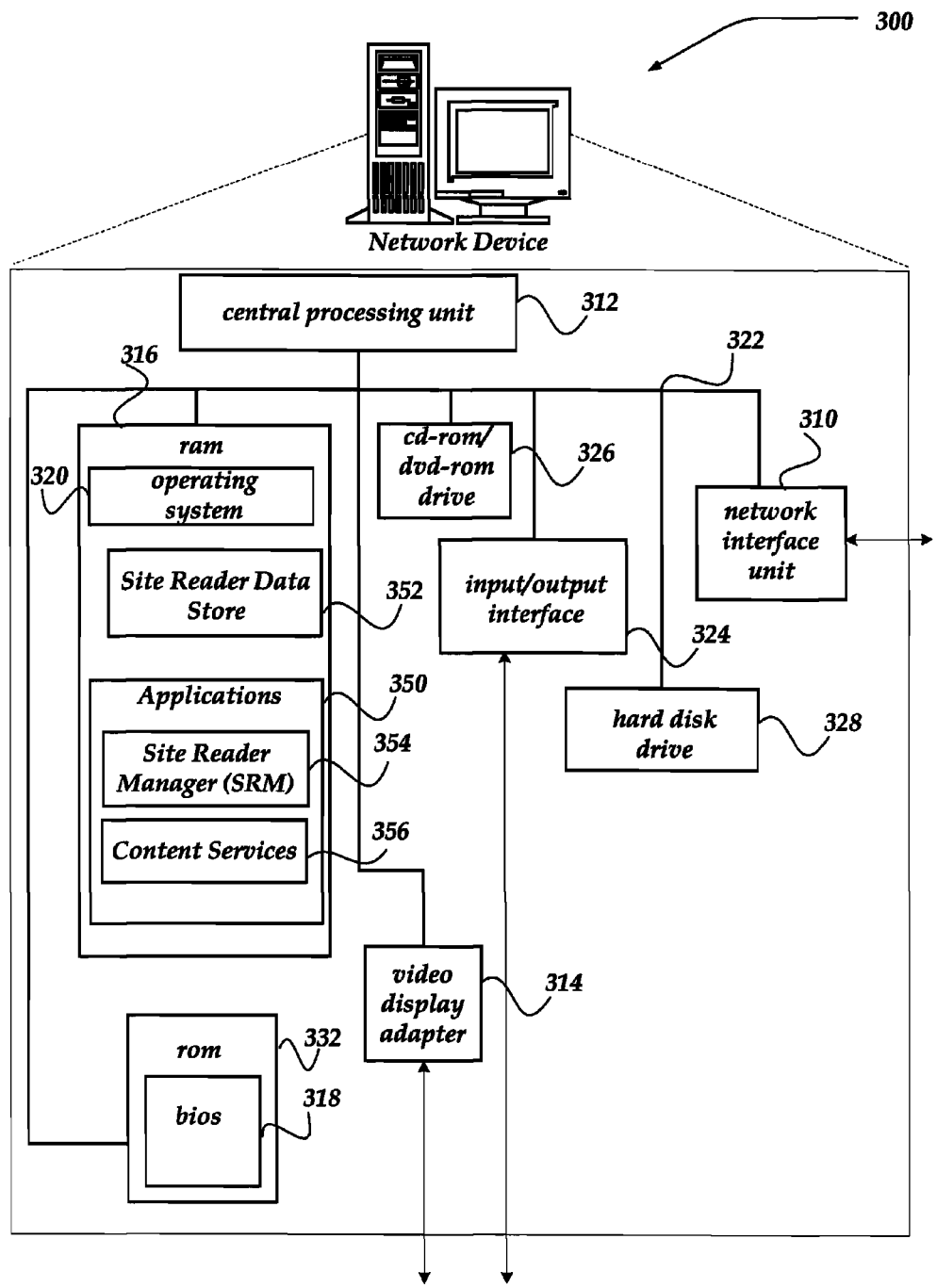
FIG. 3 shows one embodiment of a network device useable as a content service device with a reader roll.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, one of content servers 107-109 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Mass memory also includes Site Reader data store 352. Applications 350 may include Content Services 356, Site Reader Manager (SRM) 354. Site Reader data store 352 is configured to receive and manage a recent visitor's information for display within a reader roll. In one embodiment, the recent visitor information may be configured to display visitor information in a chronological order. Thus, in one embodiment, the reader roll may display at least one current visitor's information. One embodiment of an example of a reader roll is described in more detail below in conjunction with FIG. 6. In any event, site reader data store 352, may include selected information about the current visitors, including an avatar, photograph, a link, an alias, or the like. In one embodiment, site reader data store 352 may include a unique identifier associated with the recent visitors, useable to access additional information from another data store. In still another embodiment, site reader data store 352 may include a timestamp indicating when a visitor visited network device 300. Site reader data store 352 may also include other information about a visitor, including a frequency of visits, whether the visitor is to receive a benefit for visiting network device 300, or any other privileges, or the like. Site reader data store 352 may be implemented as a data base, a folder, a script, a program, or the like. Moreover, site reader data store 352 may also be configured and arranged to reside within hard disk drive 328, cd-rom/dvd-rom drive 326, a removable storage device, or any of a variety of other storage mediums.

Content services 356 may represent any of a variety of applications, scripts, applets, webpages, or the like, configured to provide content to a visitor. As such, in one embodiment, content services 356 may represent a web server that is configured to provide webpages, forms, scripts, or the like, for viewing by a visitor. In one embodiment, content services 356 may provide a weblog (blog) service to the visitor. In one embodiment, content services 356 may be configured to enable the visitor to provide inputs, comments, messages, or the like, to other visitors on network device 300. Content services 356 is not limited to blogs, however, and virtually any social networking service may be provided, including a photo service, a music service, a video service, a messaging service, a dating service, or the like. Moreover, content services 356 may also include a shopping service, or the like.

SRM 354 is configured and arranged to receive from a visitor of content services 356 a unique identifier, and to employ the unique identifier to selectively display visitor information within a reader roll, such as described below in conjunction with FIG. 6. However, SRM 354 is not constrained to employing a reader roll, and virtually any other mechanism may be employed to selectively display visitor information, including, but not limited to avatar displays, favorite hyperlinks, or the like. Therefore, the use of a reader roll should not be construed as a limitation to the invention and is merely one embodiment of an example mechanism for selectively displaying visitor information.

SRM 354 may employ the unique identifier to search a data store, or to request another application or the like, to search the data store for a match. In one embodiment, SRM 354 may also be configured to enable a display of a link, or the like, that enables a visitor sans a unique identifier to centrally register and obtain a unique identifier.

SRM 354 may also obtain a list of recent visitors for site reader data store 352 and selectively display the information within a webpage provided by content services 356. In one embodiment the recent visitor information may be displayed in chronological order. In one embodiment, the recent visitor information may be truncated after a defined number of recent visitors, displayable visitors, or the like. SRM 354 may employ, at least in part, a process such as described below in conjunction with FIG. 5 to perform at least some of its actions.

Generalized Operation

Figure 4:
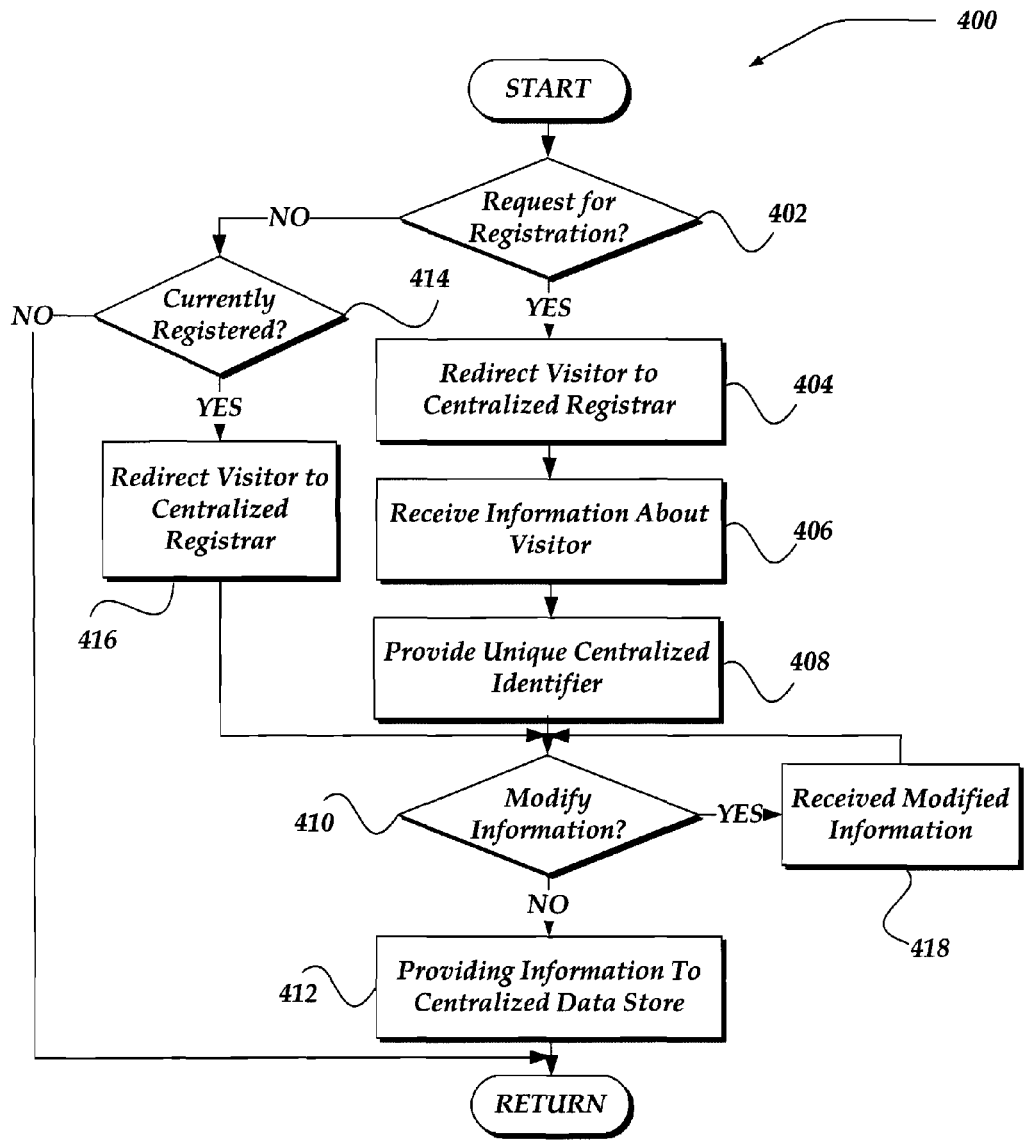
FIG. 4 illustrates a logical flow diagram generally showing one embodiment of a process for centralized reader roll registration for social networking websites.

The operation of certain aspects of the invention will now be described with respect to FIGS. 4-5. FIG. 4 illustrates a logical flow diagram generally showing one embodiment of a process for centralized reader registration for distributed social networking websites. Process 400 of FIG. 4 may, for example, be implemented in part within CR server 106 of FIG. 1, while at least some of process 400 may be implemented with content services 107-109 of FIG. 1.

Process 400 may begin, after a start block, at decision block 402 where a determination is made whether a visitor requests to be centrally registered. Such request may be performed by a visitor to a content server site, selecting registration. In one embodiment, a link or the like may be displayed on the content server site that the visitor may select for central registration. In another embodiment, the visitor may select another link that enables the visitor to modify their registration information. Thus, if the visitor is to be registered, processing flows to block 404; otherwise, processing branches to decision block 414.

At block 404, the requester may be redirected to the centralized registrar, wherein in one embodiment, a webpage, including a form screen may be displayed for use in central registration. Processing continues next to block 406, where the visitor may employ the form, selectable icons, webpage, or the like, to provide selected visitor information, such as described above. In one embodiment, the visitor may identify which content services, websites, or the like, may display at least some of the visitor's information, while another content service, website, or the like, may be identified to not display at least some of the visitor's information. However, the invention is not so limited. For example, the visitor may provide at a later time such information regarding whether a site may or may not display their visitor information. Moreover, in one embodiment, the visitor information may include selection of a preference, such as whether to be automatically registered as a member to a content service based on a variety of factors, including, but not limited to a number of visits to the content service, and number of web pages viewed within the content service, or the like. In one embodiment, the visitor may select not to be automatically registered.

In any event, such visitor information may be received and displayed for the visitor to review. The visitor information may be displayed within a web browser on the visitor's client device.

Processing continues to block 408, where, in one embodiment, a unique centralized identifier may be provided to the visitor. In one embodiment, block 408 may be performed after block 412. In one embodiment, the unique identifier may be based on a timestamp. In one embodiment, the unique identifier may be a digital value ranging in length from 8-30 bytes. However, the invention is not so constrained, and the unique identifier may also be shorter, or longer, without departing from the scope of the invention.

In one embodiment, the unique identifier may be provided to the visitor over a network using a network cookie. However, the unique identifier may also be provided using any of a variety of other mechanisms. For example, the unique identifier may be provided using a message packet, a get/post mechanism, a JavaScript, applet, or the like, without departing from the scope of the invention.

Processing continues next to decision block 410, where a determination is made whether the visitor selects to modify any of their visitor information. If not, processing continues to block 412; otherwise, processing branches to block 418, where any modifications to the visitor information may be received and displayed for further review by the visitor. It should be noted that the visitor may provide some information, modify other information, and add new information, in almost any sequence, without departing from the scope of the invention. Thus, although process 400 illustrates one sequence of events, the other sequences or out of sequences actions may also be performed. In any event, as illustrated, upon completion of block 418, the process may loop back to decision block 410.

At block 412 the visitor information may then be provided, in one embodiment, to the centralized data store. However, in another embodiment, block 412 may be performed concurrent with receiving visitor information from the visitor. Processing, in any event, may then return to a calling process to perform other actions.

Back at decision block 414, however, a determination is made whether the visitor is currently registered. This may be determined, in one embodiment, based on whether the visitor has provided a valid unique identifier. If the visitor is registered, processing flows to block 416, where the visitor may be redirected to the centralized registrar, where the visitor's information may be displayed and made available for modifying. Thus, in one embodiment, upon completion of block 416, processing flows next to decision block 410. However, if the visitor is not currently registered, processing may return to a calling process to perform other actions. For example, in one embodiment, the visitor may be redirected to a centralized registrar to enable registration. In another embodiment, the visitor may be returned to a display of content from the redirecting content server, or the like.

Figure 5:
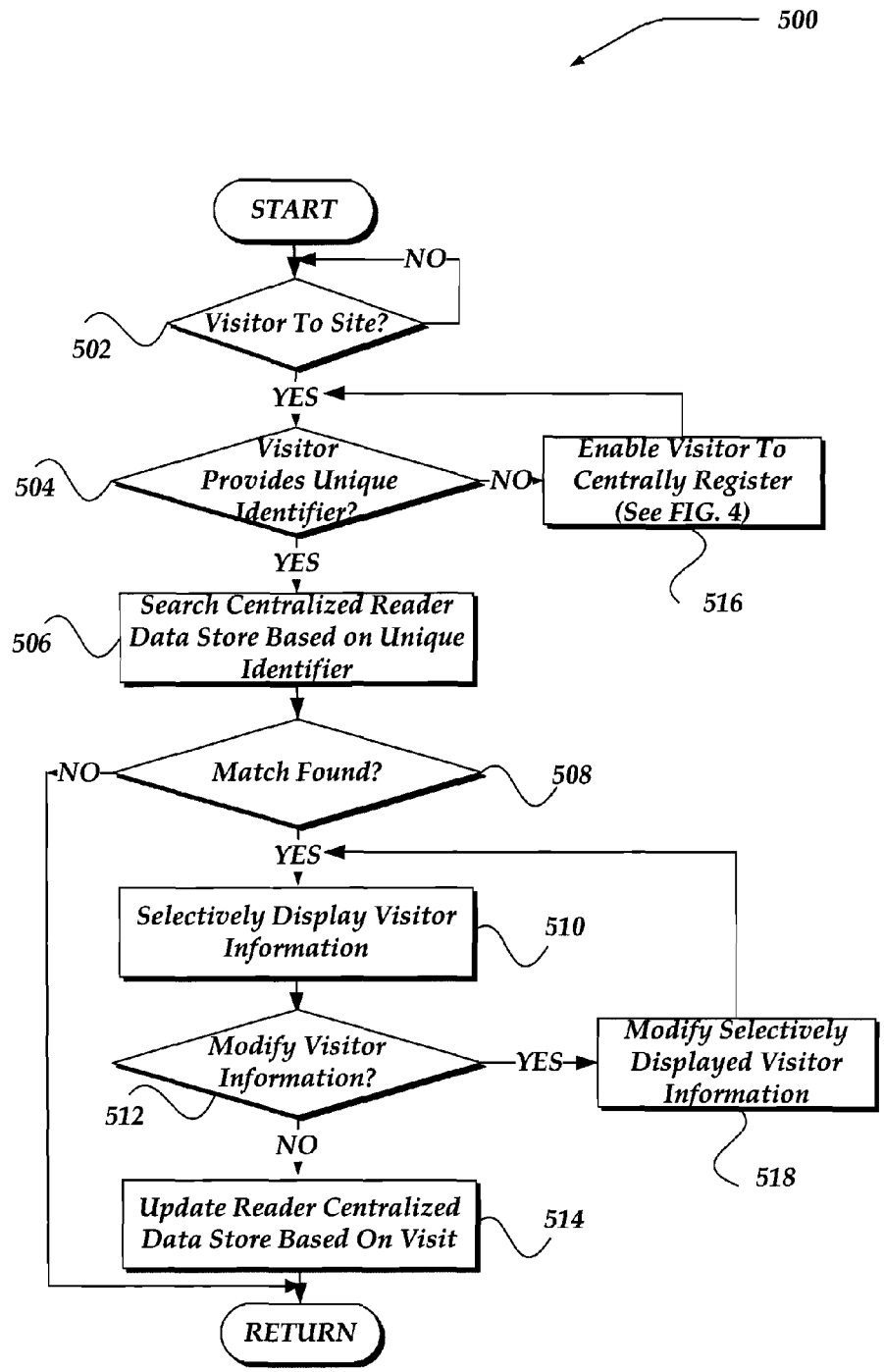
FIG. 5 illustrates a logical flow diagram generally showing one embodiment of a process for selectively displaying visitor information in a reader roll for a social networking website.

FIG. 5 illustrates a logical flow diagram generally showing one embodiment of a process for selectively displaying visitor information for distributed networking websites. By centrally registering, each networking website may be enabled to receive the visitor information distributed outwards to it. Process 500 of FIG. 5, may be implemented, at least in part, in content services 107-109 of FIG. 1.

In one embodiment, a script, applet, program, or the like, may execute on a content service monitoring for a request for content by a visitor. Thus, in one embodiment, process 500 may begin, after a start block, at decision block 502, where a determination is made whether there is a visitor (a request by a client device to serve a web page to the client device). If so, processing flows to decision block 504; otherwise, processing loops back to continue to monitor for a visitor.

At decision block 540, a determination is made whether the visitor provides a unique identifier associated with centralized registration. If so, processing flows to block 506; otherwise, processing may flow to block 516, wherein in one embodiment, the visitor might be redirected—or offered an option to be redirected—to centrally register. In one embodiment, block 516 may be performed by process 400 of FIG. 4.

At block 506, a centralized reader data store may be searched using the unique identifier. Processing continues to decision block 508, where a determination is made whether a match is found within the data store. If not, processing may return to a calling process; otherwise, processing may flow to block 510.

At block 510, registered information about the visitor may be provided to the content services, including, for example, whether the visitor information is to be displayed for this content service. Then, based on whether the visitor information is to be displayed, selective visitor information might be displayed for the visitor. In addition, other recent visitors to the content services site may also be displayed. In one embodiment, the display might be similar to that which is described below. That is, in one embodiment, the visitor information might be selectively displayed within a reader roll. However, other forms, formats, or the like, may also be employed. Thus, the invention is not constrained to reader rolls.

Processing continues next to decision block 512, where the visitor may be provided with a mechanism for selecting to modify their visitor information, including whether the visitor information is to be displayed, not displayed, or the like. In one embodiment, moving a mouse over the visitor's currently displayed information within the display of visitors may enable the visitor to select to modify their visitor information. If the visitor selects to modify their information, processing may flow to block 518; otherwise, processing may flow to block 514.

At block 518, the visitor may select to modify their information, display of their information, or the like. In one embodiment, selection not to display currently displayed information, might be performed without redirecting the visitor to another webpage. In another embodiment, however, the visitor might select to modify an avatar, an alias, or the like. In which instance, the visitor might be redirected to a process similar to process 400 of FIG. 4. Process 500 then loops back to block 510.

At block 514, a reader data store may then be updated to indicate that the current visitor is a recent visitor to the content service. In one embodiment, the updated data store may be a local data store to the content service. In another embodiment, the updated data store may be the centralized data store. Moreover, the update may include an update using the unique identifier, and may include a timestamp for when the visit is detected, an update to frequency information or the like. In one embodiment, information within the recent reader roll, data store, or the like, may be used to determine whether to, and/or provide a benefit to the visitor, including, providing access to additional content, services, or the like. Process 500 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Reader Roll

Figure 6:
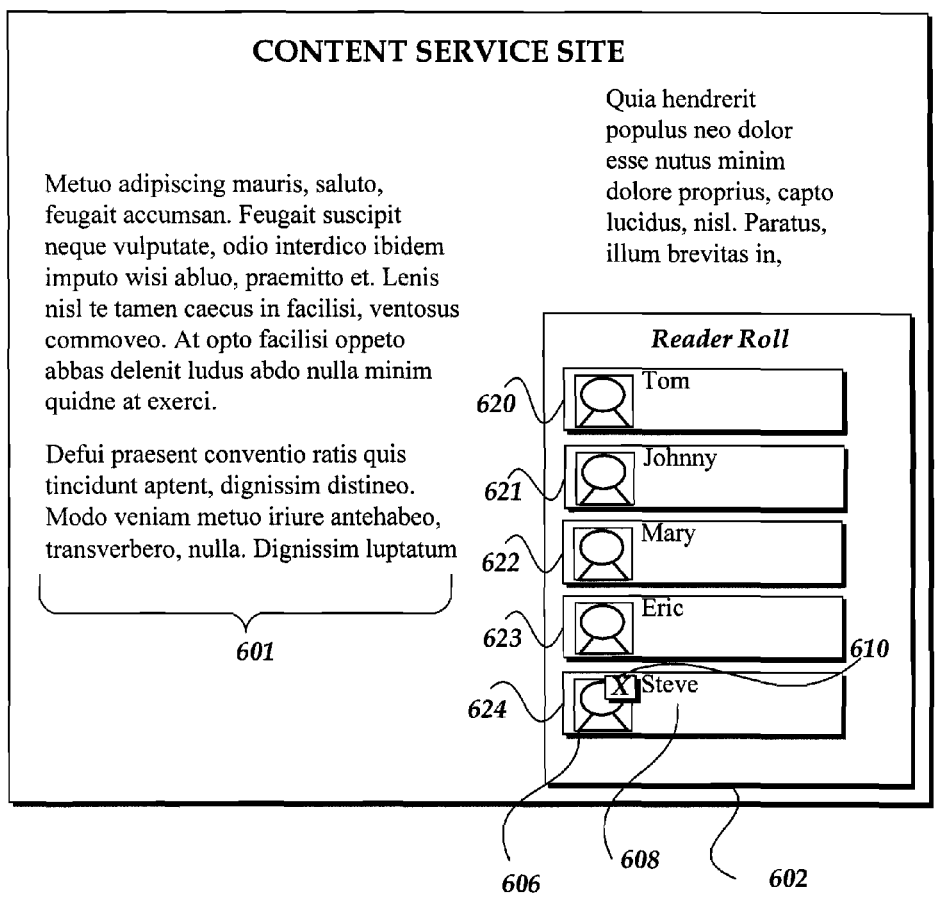
FIG. 6 illustrates another embodiment of an example display of a selective display of visitor information in a reader roll, in accordance with the present invention.

FIG. 6 illustrates another embodiment of an example display of a selective display of visitor information in a reader roll. One embodiment of display 600 may be provided to a visitor through a webpage displayable from such as content services 107-109, or the like, or FIG. 1. It should be noted that display 600 is merely one example of a possible display of visitor information, and is not intended to limit the invention. Thus, other formats, structures, and the like, may be employed to selectively display visitor information, without departing from the scope of the invention.

As shown in FIG. 6 display 600 may represent a content service site's webpage. For example, in one embodiment, display 600 may represent a blog site, a dating service site, music site, photo and/or video site, or similar social networking site. As such, display 600 may include content 601. Display 600 may also be configured and arranged to display reader roll 602.

Reader roll 602 may include one or more visitor views 620-624, each of which may include visitor information. For example, as shown, visitor view 620-624 may include an avatar 624 or similar photograph, and an alias 608. However, visitor views 620-624 may also include other visitor information, including, for example, a link to a webpage, a name, a link to a multimedia, music, or the like.

In one embodiment, visitor views 620-624 may be chronologically ordered such that a most current visitor's view is displayed foremost. For example, in one embodiment, visitor view 620 might be the current visitor's information. In one embodiment, where multiple visitors are currently viewing the display 600, the visitor views might be ordered alphabetically for the current viewers, and chronologically for recent viewers not currently viewing display 600, or other page within the content services associated with display 600. However, the invention is not so limited, and any of a variety of other ordering schemes may be employed without departing from the scope of the invention. Thus, for example, in one embodiment, the visitor views may be customized to illustrate a current viewer as the foremost visitor view 620. For example, if Tom is currently view display 600, his visitor view might be foremost for his display, while if Eric is also currently viewing the display, for his display of display 600, his visitor view might be shown before Tom's. Thus, each visitor might see their visitor view foremost over others. Unlike traditional views of reader rolls, however, reader roll 602 may display visitor views for visitors that are not currently accessing and/or displaying content from the associated content services for display 600. Moreover, in one embodiment, reader roll 602 might be aged, such that those that have not visited display 600 for a period of time might not have their visitor views displayed.

Although only five visitor views are displayed within reader roll 602, it should be clear that the invention is not so limited. For example, virtually any number of visitor views may be displayed. For example, in one embodiment, reader roll 602 may include a scroll bar, next/previous icons, or the like, to enable a visitor to display additional visitor's information.

As illustrated in visitor view 624, an icon 610 may also be displayed. In one embodiment, icon 610 might not be visible, until the visitor mouses over their visitor view. When the icon 610 is made visible, the visitor may select on it to modify a display of their visitor view. For example, in one embodiment, the visitor may select to have their visitor view not displayed for this content service website. In another embodiment, the visitor may also be provided an option to modify at least some of their visitor information, including but not limited to that information currently displayed within their visitor view. In one embodiment, selection to modify their visitor information may result in performing a process such as described above in conjunction with FIG. 4. In another embodiment, selecting to hide their visitor view might be performed without the visitor being redirected to another webpage, network server, or the like. For example, a menu, floating window, or the like, might be displayed over display 600 for the visitor to make modifications.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing network activities, comprising:
    a central registration server that is configured to perform actions, including:
        receiving a request to be centrally registered by a visitor to at least one social networking site among a plurality of social networking sites, wherein the plurality of social networking sites are different from the central registration server;
        receiving visitor information from the visitor including at least an alias or an avatar;
        providing the visitor with a unique identifier that is unique to the visitor; and
    a social networking site among the plurality of social networking sites, configured to perform actions, including:
        receiving a request from the visitor to access content at the social networking site;
        receiving the unique identifier from the visitor;
        employing the unique identifier to access at least some of the visitor information from the central registration server; and
        selectively displaying, by the social networking site being visited by the visitor, the at least some visitor information within a reader roll, wherein the reader roll includes visitor information associated with at least one other visitor to the social networking site that is not currently accessing the social networking site, and wherein selectively displaying comprises enabling the visitor to select to display visitor information at one social networking site while not displaying the visitor information at another social networking site among the plurality of social networking sites.

2. The system of claim 1, wherein the reader roll further comprises a chronological listing of information associated with visitors that have accessed content from the social networking site.

3. The system of claim 1, wherein displaying the at least some of the visitor information further comprises displaying at least one of a photograph, avatar, alias, or name associated with the visitor.

4. The system of claim 1, wherein the social networking site among the plurality of social networking sites, is configured to perform actions, further including:
    providing an interface to the visitor that enables the visitor to selectively delete the at least some visitor information from display within the reader roll.

5. The system of claim 1, wherein the social networking site is configured to perform actions, further including:
    providing a benefit to the visitor for displaying visitor information within the reader roll.

6. A non-transitory, processor readable medium that includes instructions, wherein the execution of the instructions provides for managing social networking visitor information by enabling actions, including:
    receiving a request from a visitor for content at a social networking server site;
    enabling the visitor to centrally register at a central registration server in part by providing visitor information, wherein at least some of the visitor information provided by the visitor is sharable across a plurality of social networking server sites, and wherein the central registration server is different from the plurality of social networking server sites;
    receiving a unique identifier from the centrally registered visitor, wherein the visitor obtained the unique identifier during central registration, the unique identifier being generated from at least some of the visitor information provided by the visitor;
    employing the unique identifier to access at least some of the visitor information; and
    selectively displaying at the social networking server site, the at least some visitor information within a reader roll of other visitors to the social networking server site having accessed content at the social networking server site, wherein selectively displaying comprises enabling the visitor to select to display visitor information at one social networking server site while not displaying the visitor information at another social networking server site among the plurality of social networking server sites.

7. The non-transitory, processor readable medium of claim 6, wherein the reader roll further comprises a listing of visitors in a chronological order, with a most current visitor accessing content at the social networking server site being displayed foremost in the list.

8. The non-transitory, processor readable medium of claim 6, wherein selectively displaying at the social networking server site, the at least some visitor information further comprises:
    enabling the visitor to select to display within the reader roll or to delete from the reader roll the visitor's information, wherein the selection to display or to delete is arranged and configured to enable the visitor to select or to delete display for the social networking server site independent of a selection to display or to delete the display at another social networking server site.

9. The non-transitory, processor readable medium of claim 8, wherein enabling the visitor to delete display of the visitor information further comprises enabling the visitor to mouse-over the visitor's information and select to delete the display of the information.

10. A network device to manage visitor information over a network, comprising:
    a transceiver to send and receive data over the network; and
    a processor that is operative to perform actions, including:
        receiving a request from a visitor for content at a social networking service, wherein the social networking service is hosted at the network device;
        if the visitor is unregistered centrally, enabling the visitor to be redirected to another network device, wherein the visitor is enabled to centrally register in part by providing visitor information, wherein at least some of the visitor information is sharable across a plurality of social networking services hosted by a plurality of other network devices, and wherein the other network device is different from the network device and the plurality of other network devices;

if the visitor is centrally registered, accessing from the other network device at least some of the visitor information; and selectively displaying at the social networking service, the at least some visitor information within a reader roll of other visitors to the social networking service having accessed content at the social networking service, wherein selectively displaying comprises enabling the visitor to select to display visitor information at one social networking service while not displaying the visitor information at another social networking service among the plurality of social networking services.

11. The network device of claim 10, wherein the social networking service is configured and arranged to provide at least one of a blog, a photo service, a music service, a video service, a messaging service, or a dating service.

12. The network device of claim 10, wherein if the visitor is centrally registered further comprises:

receiving a unique identifier from the visitor, wherein the visitor obtains the unique identifier during centrally registering, and wherein the identifier is unique to the visitor;

employing the unique identifier to perform a search at the other network device for a match on the unique identifier; and if a match is detected, receiving the at least some of the visitor information.

13. A client device that is operative to enable tracking of network activity, comprising:

a memory component for storing instructions; and a processing component for executing instructions that enables actions, including:

centrally registering, in part, by providing visitor information to a central registration server, wherein at least some of the visitor information is sharable across a plurality of social networking sites, wherein the central registration server is different from the plurality of social networking sites;

receiving a unique identifier that is generated based in part on at least some of the visitor information;

providing the unique identifier to one of the plurality of social networking sites; and receiving a display from the one of the plurality of social networking sites, wherein the display selectively includes at least some of the visitor information within a reader roll of other visitors to the one of the plurality of social networking sites having accessed content at the one of the plurality of social networking sites, and wherein the selective display comprises enabling the visitor to select to display visitor information at one social networking site while not displaying the visitor information at another social networking site among the plurality of social networking sites.

14. The client device of claim 13, wherein at least one of the other visitors is not currently accessing content from the one of the plurality of social networking sites.

15. The client device of claim 13, wherein centrally registering further comprises enabling the visitors to identify at least one of the plurality of social networking sites in which to not display the at least some of the visitor information.

16. A method of managing network activity over a network, comprising the following computer-implemented steps:

receiving a request to be centrally registered at a central registration server by a visitor to one of a plurality of distributed networking sites, wherein the central registration server is different from the plurality of distributed networking sites;

receiving visitor information from the visitor, wherein at least some of the visitor information is sharable across the plurality of distributed networking sites;

generating a unique identifier for the visitor based in part on at least some of the received visitor information from the visitor;

providing the visitor with unique identifier;

receiving a request from the visitor to access content at one of the distributed networking sites among the plurality;

receiving from the visitor the unique identifier;

employing the unique identifier to access at least some of the visitor information from the central registration server; and selectively displaying the at least some of the visitor information within the one networking site, wherein the display includes visitor information associated with at least one other visitor to the one networking site that is not currently accessing the one networking site, and wherein selectively displaying comprises enabling the visitor to select to display visitor information at one distributed networking site while not displaying the visitor information at another distributed networking site among the plurality of distributed networking sites.

17. The method of claim 16, wherein selectively displaying further comprises:

determining if the visitor selected to have the at least some visitor information not to be displayed, and if so, not displaying the at least some visitor information.

18. The method of claim 16, further comprising:

detecting a mouse-over of the displayed visitor information for the visitor; and enabling the visitor to delete the visitor information from display within the one networking site, while maintaining display of the visitor information at another one of the plurality of distributed networking sites.

19. The network device of claim 10, further comprising:

enabling the visitor to be redirected to the other network device, wherein the visitor is enabled to modify the visitor information.

* * * * *